(12) United States Patent
de Oliveira et al.

(10) Patent No.: US 11,499,264 B2
(45) Date of Patent: Nov. 15, 2022

(54) METHOD FOR THE PRODUCTION OF CONDUCTIVE STRUCTURES

(71) Applicant: Leibniz-Institut für Neue Materialien gemeinnützige GmbH, Saarbrücken (DE)

(72) Inventors: Peter William de Oliveira, Saarbrücken (DE); Jennifer S. Atchison, Sulzbach (DE)

(73) Assignee: Leibniz-Institut für Neue Materialien gemeinnützige GmbH, Saarbrücken (DE)

(*) Notice: Subject to any disclaimer, the term of this patent is extended or adjusted under 35 U.S.C. 154(b) by 108 days.

(21) Appl. No.: 15/774,606

(22) PCT Filed: Dec. 22, 2016

(86) PCT No.: PCT/EP2016/082480
§ 371 (c)(1),
(2) Date: May 9, 2018

(87) PCT Pub. No.: WO2017/109131
PCT Pub. Date: Jun. 29, 2017

(65) Prior Publication Data
US 2018/0320308 A1  Nov. 8, 2018

(30) Foreign Application Priority Data
Dec. 23, 2015 (DE) .............. 10 2015 122 788.6

(51) Int. Cl.
*D01H 4/28* (2006.01)
*D06M 11/83* (2006.01)
(Continued)

(52) U.S. Cl.
CPC ....... *D06M 11/83* (2013.01); *C04B 35/62259* (2013.01); *D01D 5/003* (2013.01);
(Continued)

(58) Field of Classification Search
CPC .... D01D 5/0007; D01D 5/003; D01D 5/0053; D01D 10/02; C04B 35/62259;
(Continued)

(56) References Cited

U.S. PATENT DOCUMENTS 4,721,632 A   1/1988 Brown
8,414,806 B2  4/2013 Sun et al.
(Continued)

FOREIGN PATENT DOCUMENTS

CN   102311681 A   1/2012
DE   102010052033 A1  5/2012
(Continued)

OTHER PUBLICATIONS

Li, Dan, et al., Photocatalytic deposition of gold nanoparticles on electrospun nanofibers of titania, Chemical Physics Letters, 394 (2004) pp. 387-391. (Year: 2004).*
(Continued)

*Primary Examiner* — Matthew D Matzek
(74) *Attorney, Agent, or Firm* — Cahn & Samuels, LLP

(57) ABSTRACT

A method for the production of conductive structures, wherein nanofibers are applied with a photocatalytic component onto a substrate, in particular by electrospinning, and wherein a metallic layer is deposited photolytically on the substrate.

11 Claims, 13 Drawing Sheets

(51) Int. Cl.
| C04B 35/622 | (2006.01) |
| D01D 5/00 | (2006.01) |
| D01D 10/02 | (2006.01) |
| D01D 10/00 | (2006.01) |
| D01F 1/10 | (2006.01) |
| D01F 1/09 | (2006.01) |
| D01F 6/20 | (2006.01) |
| D06M 101/16 | (2006.01) |

(52) U.S. Cl.
CPC ......... D01D 5/0007 (2013.01); D01D 5/0053 (2013.01); D01D 10/00 (2013.01); D01D 10/02 (2013.01); D01F 1/09 (2013.01); D01F 1/10 (2013.01); D01F 6/20 (2013.01); C04B 2235/441 (2013.01); C04B 2235/5264 (2013.01); D06M 2101/16 (2013.01); D10B 2101/08 (2013.01); D10B 2101/20 (2013.01); D10B 2401/16 (2013.01); D10B 2401/20 (2013.01)

(58) Field of Classification Search
CPC .............. D06M 11/83; D06M 2101/20; D10B 2101/02; B01D 2323/39; D01H 4/28; D04H 1/728
USPC .................................. 977/762; 428/357, 364
See application file for complete search history.

(56) References Cited

U.S. PATENT DOCUMENTS

| 2009/0061194 | A1 | 5/2009 | Green et al. |
| 2010/0078070 | A1 | 4/2010 | Hoyosa et al. |
| 2010/0233812 | A1* | 9/2010 | Sun ................... B01D 67/0046 435/401 |
| 2010/0285972 | A1 | 11/2010 | Dubrow et al. |
| 2011/0095275 | A1 | 4/2011 | Li et al. |
| 2013/0040516 | A1 | 2/2013 | Pruneri et al. |
| 2013/0075632 | A1 | 3/2013 | Cho et al. |
| 2013/0101796 | A1 | 4/2013 | Artz et al. |
| 2013/0236708 | A1 | 9/2013 | Moh et al. |
| 2013/0236732 | A1 | 9/2013 | de Oliveira et al. |
| 2014/0251662 | A1 | 9/2014 | Rotto et al. |
| 2016/0305016 | A1 | 10/2016 | de Oliveira et al. |
| 2017/0056873 | A1* | 3/2017 | Jones ................... C02F 1/32 |
| 2018/0251370 | A1 | 9/2018 | Maurer et al. |

FOREIGN PATENT DOCUMENTS

| DE | 112011100593 | T5 | 1/2013 |
| EP | 1323793 | A1 | 7/2003 |
| EP | 1947701 | A2 | 7/2008 |
| JP | 2002285036 | A | 10/2002 |
| JP | 2012207178 | A | 10/2012 |
| JP | 2014504330 | A | 2/2014 |
| WO | 2009/120151 | A1 | 10/2009 |

OTHER PUBLICATIONS

Sanz, J., et al., "Influence of Amorphous Tio2-x on Titania Nanoparticle Growth and Anatase-to-Rutile Transformation," The Journal of Physical Chemistry C, 116, 8, 5110-5115. (Year: 2012).*

Nam, et al., "Ag or Au Nanoparticle-embedded One-Dimensional Composite TiO2 Nanofibers Prepared via Electrospinning for Use in Lithium-Ion Batteries," Applied Materials & Interfaces, vol. 2, No. 2, pp. 2046-2052 (Jul. 8, 2010) (Year: 2010).*

Bickley et al., "A Structural Investigation of Titanium Dioxide Photocatalysts," Journal of Solid Chemistry, vol. 92, Issue 1, pp. 178-190, May 1991 (Year: 1991).*

Bickley, et al., "A Structural Investigation of Titanium Dioxide Photocatalysts, Journal of Solid State Chemistry," 92, 178-190 (1991). (Year: 1991).*

Li, et al., Enhanced Photocatalytic Activity of Electrospun TiO2 Nanofibers with Optimal Anatase/Rutile Ratio, Journal of the American Ceramic Society, vol. 94, Issue 10, pp. 3184-3187, Oct. 2011. (Year: 2011).*

Feng et al., "Simple and rapid synthesis of ultrathin gold nanowires, their self-assembly and application in surface-enhanced Raman scattering", Chem. Commun., 2009, 1984-1986.

Gonzales-Garcia et al., "Ultrathin gold nanowires for transparent electronics: breaking barriers", Procedia Engineering 141 (2016) 152-156.

Maurer et al., "Sintering of Ultrathin Gold Nanowires for Transparent Electronics", ACS Appl. Mater. Interfaces 2015, 7, 7838-7842.

English Abstract of DE 112011100593T5, Jan. 24, 2013.

Li et al., "Photocatalytic deposition of gold nanoparticles on electrospun nanofibers of titania", Chemical Physics Letters 394 (2004) 387-391.

Aryal et al., "Deposition of gold nanoparticles on electrospun MgTiO3 ceramic nanofibers", J. Nanosci. Nanotechnol., vol. 6, No. 2, 2006, 510-513.

Long et al., "Improving the electrical catalytic activity of Pt/TiO2 nanocomposites by a combination of electrospinning and microwave irradiation", J. Nanopart. Res. (2011) 13:1655-1662.

Zhang et al., "Anatase Mesoporous TiO2 Nanofibers with High Surface Area for Solid-State Dye-Sensitized Solar Cells", Small 2010, 6, No. 19, 2176-2182.

Mondal et al., "Highly Sensitive Biofunctionalized Mesoporous Electrospun TiO2 Nanofiber Based Interface for Biosensing", ACS Appl. Mater. Interfaces 2014, 6, 2516-2527.

English translation of the International Preliminary Report on Patentability, dated Jul. 5, 2018.

English Abstract for CN102311681 A, Jan. 11, 2012.

Sanz et al., "Influence of Amorphous TiO2-x on Titania Nanoparticle Growth and Anatase-to-Rutile Transformation", J. Phys. Chem. C., 2012, 116, 5110-5115.

English Abstract for JP2002285036 A, Oct. 3, 2002.

English Abstract for JP2012207178 A, Oct. 25, 2012.

Ohtani et al., "What is Degussa (Evonik) P25? Crystalline composition analysis, reconstruction from isolated pure particles and photocatalytic activity test", Journal of Photochemistry and Photobiology A: Chemistry, 216(2-3), 2010, 179-182.

* cited by examiner a)

b)

a)

b)

a)

b)

METHOD FOR THE PRODUCTION OF CONDUCTIVE STRUCTURES

This patent application is a U.S. national stage application of PCT international application PCT/EP2016/082480 filed on 22 Dec. 2016 and claims priority of German patent document 10 2015 122 788.6 filed on 23 Dec. 2015, the entireties of which are incorporated herein by reference.

FIELD OF THE INVENTION

The invention relates to a process for producing metallic, especially conductive, structures, and to substrates of this kind and to the use thereof.

BACKGROUND OF THE INVENTION

Fibers which are obtained by electrospinning have a very high aspect ratio. This is advantageous for applications which require a large surface area coupled with low volume. For instance, $TiO_2$ nanofibers coated with silver nanoparticles have been used for surface-enhanced Raman spectroscopy, antibacterial coatings, photocatalysis and energy conversion. Conductive nanofibers have also been proposed as electrodes or for touchscreens.

At the same time, the known processes are frequently very complex and do not allow good structuring of the coating obtained.

The problem addressed by the invention is that of specifying a process that allows the production of metallic structures based on nanofibers, especially of transparent conductive structures.

SUMMARY OF THE INVENTION

This problem is solved by the inventions having the features of the subsidiary claims. Advantageous developments of the inventions are identified in the dependent claims. The wording of all claims is hereby incorporated into this description by reference. The inventions also encompass all meaningful and especially all mentioned combinations of independent and/or dependent claims.

The problem is solved by a process for producing metallic structures. There follows a detailed description of individual process steps. The steps need not necessarily be conducted in the sequence specified, and the process to be outlined may also have further, unspecified steps. The process comprises the following steps:

a) providing nanofibers comprising a photocatalytic component on a substrate;

b) contacting at least one precursor compound for a metallic structure with the nanofibers;

c) reducing the at least one precursor compound to the metallic structure by action of electromagnetic radiation on the photocatalytic component.

In step c), a metal layer is typically formed. In this case, a metallic layer in the context of the invention is understood to mean a layer of a metal. Layers of this kind may also be conductive given adequate thickness. Conductive layers of this kind are particularly preferred. "Conductive" here does not necessarily mean the production of structures which intrinsically constitute a conductor track. The production of dots from conductive material also constitutes a structure which is conductive in principle.

The use of nanofibers can achieve formation of the metallic layer along the fibers, thus enabling thinner conductive structures. The photocatalytic activity of the fibers can achieve selective reduction at the fibers. Since the precursor compound itself is light-sensitive only to a minor degree, if at all, it is much easier to handle.

The substrate on which the nanofibers are provided may be any material suitable for this purpose. Examples of suitable materials are metals or metal alloys, glass, ceramic, including oxide ceramic, glass ceramic or plastics, and paper and other cellulosic materials. It is of course also possible to use substrates having a surface layer of the aforementioned materials. The surface layer may, for example, be a metalization, an enameling, a glass or ceramic layer, or a paint system.

Examples of metals or metal alloys are steel, including stainless steel, chromium, copper, titanium, tin, zinc, brass and aluminum. Examples of glass are soda-lime glass, borosilicate glass, lead crystal and silica glass. The glass may, for example, be plate glass, hollow glass such as vessel glass, or laboratory equipment glass. The ceramic may, for example, be a ceramic based on the oxides $SiO_2$, $Al_2O_3$, $ZrO_2$ or $MgO$, or the corresponding mixed oxides. Examples of the plastic which, like the metal too, may be present in the form of a film, are polyethylene, e.g. HDPE or LDPE, polypropylene, polyisobutylene, polystyrene (PS), polyvinyl chloride (PVC), polyvinylidene chloride, polyvinyl butyral, polytetrafluoroethylene, polychloro-trifluoroethylene, polyacrylates, polymethacrylates such as polymethylmethacrylate (PMMA), polyamide, polyethylene terephthalate (PET), polycarbonate, regenerated cellulose, cellulose nitrate, cellulose acetate, cellulose triacetate (TAC), cellulose acetate butyrate or rubber hydrochloride. A painted surface may be formed from standard basecoats or paints. In a preferred embodiment, the substrates are films, especially polyethylene terephthalate films or polyimide films. If the production of the structures is effected directly on the surface, the surface has to be able to withstand the conditions of production, for example the temperatures.

The nanofibers comprise at least one photocatalytically active component. A photocatalytically active component is understood to mean a compound which brings about the reduction of a metal ion in a metal complex to the metal directly and/or brings it about indirectly by oxidative aging of the metal complex or a further substance without being broken down itself. The products that arise in the oxidation result in breakdown of the metal complex and reduction of the metal ion of the complex. The photocatalytic material may be ZnO or $TiO_2$, preference being given to $TiO_2$. More preferably, the $TiO_2$ is in anatase form.

In a particularly preferred embodiment of the invention, the titanium dioxide is at least in the form of anatase and of amorphous titanium dioxide. More preferably, the size of the anatase crystallites is below 20 nm, preferably below 10 nm (determined by x-ray diffraction), embedded in a matrix of amorphous titanium dioxide. The fibers consist of a composite of anatase and amorphous titanium dioxide. This conversion can be controlled via the choice of the calcination conditions.

Particular preference is given to fibers having a specific surface area of at least 80 $m^2/g$, preferably of at least 90 $m^2/g$, especially fibers which consist of a composite of anatase and amorphous titanium dioxide.

Preferably, the nanofibers have an average length of more than 10 μm, especially more than 20 μm, more preferably more than 50 μm.

In a preferred embodiment of the invention, the nanofibers are obtained by electrospinning.

For this purpose, a composition composed of a matrix material or a precursor thereof and a photocatalytic component or a precursor thereof is produced.

This is spun by means of electrospinning to give a nanofiber.

It may be necessary to treat the fibers, for example to dry them, for example at temperatures below 200° C., especially below 150° C.

It may be necessary to leave the fibers to rest directly after the electrospinning for at least 12 hours prior to further processing.

It may be necessary to apply the nanofibers to the ultimate substrate.

Preferably, the nanofibers after the electrospinning have an average diameter of below 1 µm, especially below 500 nm (determined by ESEM), especially below 400 nm. The fibers preferably have a round cross section. The diameter is preferably 30 nm to 500 nm, especially 50 to 350 nm.

Before they are used, it may be necessary to subject the fibers to a thermal treatment at above 300° C., especially above 400° C., preferably 300 to 800° C., especially 300° C. to 600° C. The duration of the thermal treatment may be between 1 minute and 5 hours. In the case of use of titanium dioxide, it is thus possible to obtain anatase.

In one embodiment of the invention, the photocatalytically active component comprises nanoparticles, preferably nanoparticles produced by a non-hydrolytic sol-gel process. For this purpose, a hydrolyzable titanium compound and/or zinc compound is reacted with an alcohol and/or an acid, preferably carbonic acid, preferably under protective gas atmosphere. The reaction is preferably conducted at temperatures between 10° C. and 100° C., preferably between 15° C. and 30° C. In one embodiment, the reaction can be conducted at room temperature.

The hydrolyzable titanium compound is especially a compound of the formula $TiX_4$ where the hydrolyzable X groups, which may be the same or different, are, for example, hydrogen, halogen (F, Cl, Br or I, especially Cl and Br), alkoxy (preferably $C_{1-6}$-alkoxy, especially $C_{1-4}$-alkoxy, for example methoxy, ethoxy, n-propoxy, i-propoxy, butoxy, i-butoxy, sec-butoxy and tert-butoxy), aryloxy (preferably $C_{6-10}$-aryloxy, for example phenoxy), acyloxy (e.g. $C_{1-6}$-acyloxy, for example acetoxy or propionyloxy) or alkylcarbonyl (preferably $C_{2-7}$-alkylcarbonyl, for example acetyl). One example of a halide is $TiCl_4$. Further hydrolyzable X radicals are alkoxy groups, especially $C_{1-4}$-alkoxy. Specific titanates are $Ti(OCH_3)_4$, $Ti(OC_2H_5)_4$ and $Ti(n-$ or $i-OC_3H_7)_4$.

In the case of a zinc compound, one option is carbonic acid compounds of zinc, for example $Zn(OAc)_2$.

The alcohol and/or the acid are generally lower alcohols and inorganic acids or carboxylic acids. Examples of such compounds are alkyl alcohols, such as methanol, ethanol, n-propanol, i-propanol, n-butanol, i-butanol, neopentanol, glycol, propane-1,3-diol or benzyl alcohols, such as benzyl alcohol which may also be substituted on the aromatic ring. Examples of carboxylic acids include, for example, formic acid, acetic acid, propionic acid, butyric acid, oxalic acid. It is also possible to use mixtures of the solvents. The compound is preferably also used as solvent, i.e. in a distinct excess. Examples of inorganic acids are hydrochloric acid, sulfuric acid, phosphoric acid or nitric acid. These acids can be used as a solution in water or in alcohol. It may be necessary to support the hydrolysis by addition of water.

In order to obtain crystalline nanoparticles, it may be necessary also to conduct a heat treatment, preferably one heat treatment, for example under autogenous pressure as well. For this purpose, the reaction mixture is treated in a closed vessel at a temperature between 50° C. and 300° C. for 2 hours to 48 hours.

The nanoparticles obtained can be obtained by simple centrifugation and removal of the solvent.

Preferably, these nanoparticles have an average diameter of below 200 mm (measured by TEM), preferably below 100 mm, especially below 50 nm.

The nanoparticles may also be doped, for example in order to shift their absorption into other spectral regions.

For this purpose, in the nanoparticles, in the production thereof, a suitable metal compound can be used for doping, for example an oxide, a salt or a complex, e.g. halides, nitrates, sulfates, carboxylates (e.g. acetates) or acetylacetonates. The compound should appropriately be soluble in the solvent used for the production of the nanoparticles. A suitable metal is any metal, especially a metal selected from groups 5 to 14 of the Periodic Table of the Elements and the lanthanoids and actinides. The groups are listed here in accordance with the new IUPAC system as reflected in Römpp Chemie Lexikon, $9^{th}$ edition. The metal may occur in any suitable oxidation precursor in the compound.

Examples of suitable metals for the metal compound are W, Mo, Zn, Cu, Ag, Au, Sn, In, Fe, Co, Ni, Mn, Ru, V, Nb, Ir, Rh, Os, Pd and Pt. Metal compounds of W(VI), Mo(VI), Zn(II), Cu(II), Au(III), Sn(IV), In(III), Fe(III), Co(II), V(V) and Pt(IV) are used with preference. Very good results are achieved especially with W(VI), Mo(VI), Zn(II), Cu(II), Sn(IV), In(III) and Fe(III). Specific examples of preferred metal compounds are $WO_3$, $MoO_3$, $FeCl_3$, silver acetate, zinc chloride, copper(II) chloride, indium(III) oxide and tin(IV) acetate.

The ratio between the metal compound and the titanium or zinc compound also depends on the metal used and the oxidation state thereof. In general, for example, the ratios used are such as to result in a molar ratio of metal of the metal compound to titanium/zinc of the titanium or zinc compound (Me/Ti(Zn)) of 0.0005:1 to 0.2:1, preferably 0.001:1 to 0.1:1 and more preferably 0.005:1 to 0.1:1.

The nanoparticles obtained may also be surface-modified, for example in order to impart compatibility with the matrix material used thereto. It is also possible, for example by surface modification with fluorinated groups, to achieve a concentration gradient of the nanoparticles within the fibers. The nanoparticles accumulate at the surface of the fiber.

In another embodiment of the invention, the composition comprises a precursor compound for the photocatalytically active component. These are, for example, the aforementioned hydrolyzable compounds for the nanoparticles. It may be necessary first to convert the compound to a sol. This can be accomplished, for example, by adding an acid, such as acetic acid, hydrochloric acid, etc.

The composition also comprises at least one matrix material on at least one precursor thereof. This may be an organic, inorganic or organically modified inorganic matrix-forming material. This may especially comprise inorganic sols or organically modified inorganic hybrid materials. Examples of these are optionally organically modified oxides, hydrolyzates and (poly)condensates of at least one glass- or ceramic-forming element M, especially an element M from groups 3 to 5 and/or 12 to 15 of the Periodic Table of the Elements, preferably of Si, Al, B, Ge, Pb, Sn, Ti, Zr, V and Zn or mixtures thereof. It is also possible for proportions of elements of groups 1 and 2 of the Periodic Table (e.g. Na, K, Ca and Mg) and of groups 5 to 10 of the Periodic Table (e.g. Mn, Cr, Fe and Ni) or lanthanoids to be present in the oxide, hydrolyzate or (poly)condensate. This may, for example, be a sol comprising Ti, which may optionally simultaneously be the precursor for the photocatalytically active component.

In the case of an organic matrix material, it is possible to use organic polymers and/or oligomers, preferably organic polymers and/or oligomers having polar groups such as hydroxyl, primary, secondary or tertiary amino, carboxyl or carboxylate groups. Typical examples are polyvinyl alcohol, polyethylene oxide, polyvinylpyrrolidone, polyacrylamide, polyvinyl-pyridine, polyallylamine, polyacrylic acid, polyvinyl acetate such as polyvinyl butyral, polymethyl-methacrylic acid, starch, gum arabic, other polymeric alcohols, for example polyethylene-polyvinyl alcohol copolymers, polyethylene glycol, polypropylene glycol and poly(4-vinylphenol) or monomers or oligomers derived therefrom. Preference is given to polyvinylpyrrolidone (PVA).

Preference is given to organic polymers having a molecular mass of more than 200 000 g/mol (weight-average $M_W$) to 300 000 g/mol.

The composition may also contain at least one solvent. All constituents must be soluble or dispersible in the solvent. They may, for example, be alcohols such as methanol, ethanol or isopropanol. Preference is given to one or more solvents having a boiling point below 150° C., especially below 100° C.

It is also possible for further additives to be present, such as interface-active agents, antioxidants, plasticizers.

The viscosity of the composition can be adjusted according to the electrospinning conditions.

Depending on the composition, the content of matrix component in the case of an organic matrix component is between 2% and 15% by weight of the composition, especially between 2% and 10% by weight.

It may be necessary to mix the composition for 1 hour to 72 hours prior to the electrospinning, especially when the composition comprises hydrolyzable compounds.

Preferred conditions for the electrospinning are a voltage of 8 to 20 kV at a flow rate of the spinning dope of 0.3 to 1.5 mL/h. The distance from the surface on which the fibers are collected is preferably 10 to 30 cm. Preference is given to using a needle having an internal diameter of 0.4 mm to 2 mm.

In one embodiment of the invention, the fibers are produced via electrospinning with a concentric ring nozzle. Nozzles of this kind have a central opening and a surrounding annular opening. Therefore, the fibers can be produced from two different compositions, one of which forms the core (central ring nozzle) and the other the shell (surrounding ring opening) of the fiber. This makes it possible, for example, to produce fibers which have the photocatalytic component in the shell only and not in the core.

In a preferred embodiment (i) of the invention, the spinning composition comprises photocatalytically active nanoparticles, preferably $TiO_2$, more preferably anatase, and at least one organic polymer, preferably PVA. For this purpose, preference is given to using nanoparticles produced as described above.

In a further preferred embodiment (ii) of the invention, the spinning composition comprises a precursor for a photocatalytic component, especially a hydrolyzable titanium compound or a condensate thereof, and at least one organic polymer and/or oligomer, as described above. These are, for example, the aforementioned hydrolyzable compounds for the nanoparticles. It may be necessary first to convert the compound to a sol. This can be accomplished, for example, by adding an acid, such as acetic acid, hydrochloric acid, etc.

In a further preferred embodiment (iii) of the invention, the composition for the shell of the fibers comprises photocatalytically active nanoparticles and the composition for the core at least one organic polymer, in which case the fibers are electrospun by means of a coaxial ring nozzle. In a later step, the polymer can be removed, for example by means of solvent and/or calcination. This affords photocatalytically active tubes.

In a further preferred embodiment (iv) of the invention, the composition for the shell comprises photocatalytically active nanoparticles and the composition for the core at least one precursor compound for the photocatalytic component.

In a particular embodiment of the invention according to (ii), the precursor compound is a precursor compound for titanium dioxide and the fibers produced are subjected to a thermal treatment prior to use. Preferably, the conditions for the thermal treatment are chosen such that the precursor compound affords a composite of anatase and amorphous titanium dioxide, especially anatase crystallites in a matrix of amorphous titanium dioxide. This is especially accomplished by a calcination temperature above 400° C. and below 500° C., preferably above 420° C. and below 480° C., even more preferably above 430° C. and below 470° C., especially 440° C. to 460° C. The duration of this thermal treatment is preferably between 30 minutes and 4 hours. Especially at temperatures between 430° C. and 470° C., fibers having particularly high porosity and simultaneously containing crystallites of anatase in a matrix of amorphous titanium dioxide are obtained. This is particularly favorable for homogeneous metalization. In this way, conductive structures can be obtained. The heating rate is preferably 1-3° C./min.

The thermal treatment can take place on the ultimate substrate.

In a next step, a precursor composition comprising at least one precursor compound for a metal layer is applied to the substrate. The precursor composition can be applied using customary methods, for example dipping, rolling, knife coating, flow coating, drawing, spraying, spinning or painting. Typically, the precursor composition is a solution or suspension of the at least one precursor compound. This solution may also contain a mixture of multiple precursor compounds. It is also possible for further auxiliaries, such as reducing agents or wetting auxiliaries, to be present in the solution.

The precursor compound is preferably a metal complex. This comprises at least one metal ion or a metal atom and at least one type of ligands. The metal is, for example, copper, silver, gold, nickel, zinc, aluminum, titanium, chromium, manganese, tungsten, platinum or palladium. In a preferred embodiment, the precursor compound is a silver, gold or copper complex, more preferably a silver complex. The precursor compound may also comprise multiple types of metal or mixtures of metal complexes.

Ligands used are generally chelate ligands. These are capable of forming particularly stable complexes. These are compounds having multiple hydroxyl groups and/or amino groups. Preference is given to compounds having a molecular weight below 200 g/mol, particular preference to compounds having at least one hydroxyl group and at least one amino group. Examples of possible compounds are 3-aminopropane-1,2-diol, 2-amino-1-butanol, tris-(hydroxymethyl)aminomethane (TRIS), $NH_3$, nicotinamide or 6-aminohexanoic acid. It is also possible to use mixtures of these ligands. In the case of the preferred silver complex, TRIS is preferred as ligand.

The precursor composition is preferably a solution of the precursor compound. Useful solvents include all suitable solvents. These are, for example, water, alcohols such as methanol, ethanol, n-propanol or i-propanol. It is also possible to use mixtures of the solvents, preferably mixtures of water and ethanol. A suitable mixing ratio is a ratio of 50:50% by weight up to 20:80% by weight of $H_2O$:alcohol, preferably ethanol.

The precursor composition may additionally also comprise further auxiliaries, such as surfactants or supporting reducing agents.

The precursor composition may be applied to the substrate in any desired manner. The precursor composition is applied such that the photocatalytic activity of the nanofibers can directly or indirectly trigger the reduction of the metal ion to the metal. This is typically accomplished in that the precursor composition is applied directly to the nanofibers.

Application of the precursor composition can be accomplished using standard methods, for example dipping, spraying, rolling, knife coating, flow coating, drawing, spraying, spinning or painting.

For example, the application of the precursor composition can occur via a frame which is placed onto the substrate and the precursor composition is introduced into the space bounded by the frame which is then formed. The frame may consist of an elastic material. The frame may have any desired shapes. It is typically a rectangular frame. The frame encloses, for example, an area on the substrate of between 1 $cm^2$ to 625 $cm^2$ with a side length between 1 cm and 25 cm. The height of the frame on the substrate determines the thickness of the precursor composition applied. The frame may be between 25 μm and 5 mm in height, preferably between 30 μm and 2 mm.

In a next step, the metal ion of the precursor compound is reduced to the metal by action of electromagnetic radiation on the photocatalytic component of the fibers. This forms a metallic layer. The electromagnetic radiation is radiation of the wavelength for excitation of the photocatalytic component. The irradiation can be accomplished by using an areal radiation source, such as a lamp, or by laser. Preference is given to using a wavelength in the visible or ultraviolet (UV) range of the electromagnetic spectrum, preferably radiation with a wavelength of <500 nm, for example between 200 and 450 nm or between 250 nm to 410 nm. Preference is given to radiation having a wavelength of <400 nm.

The light source used may be any suitable light source. Examples of a light source are mercury vapor lamps or xenon lamps.

The light source is arranged at a suitable distance from the substrate to be exposed. The distance may, for example, be between 2.5 cm and 50 cm. The intensity of the radiation within a spectral range from 250 nm to 410 nm may be between 30 $mW/cm^2$ and 70 $mW/cm^2$.

The irradiation should if at all possible be effected at right angles to the surface to be exposed.

The irradiation is conducted within the duration sufficient to form the metallic layer. The duration depends here on the coating, the type of initiator, the type of lamp, the wavelength range used and the intensity of the irradiation. If conductive structures are to be created, longer irradiation may be required. Preference is given to a duration for the irradiation between 5 seconds and 30 minutes, preferably between 20 seconds and 15 minutes.

If a laser is used for irradiation, it is possible to use, for example, an argon ion laser (351 nm) at 10 mW, the laser beam from which is guided across the substrate to be irradiated in a focused and collimated manner and with a speed of 2 mm/s.

In a further embodiment of the invention, the substrate is subjected to further treatment after the irradiation and reduction of the precursor compound. For example, the unreduced excess precursor composition can be removed by rinsing the surface, for example with deionized water or another suitable substance. The coated substrate can then be dried, for example by heating in an oven, compressed air and/or by drying at room temperature.

Irradiation can also be effected repeatedly, for example 2, 3 or 4 times.

In a preferred embodiment, after a first irradiation, the substrate is washed and then at least one further irradiation is conducted. This can reduce unselective deposition on the surface.

It is also possible to apply further layers, for example for protection of the coated surface from oxidation and water or from UV radiation.

In a preferred embodiment of the invention, structuring is effected on application of the precursor composition and/or in the reduction. In the context of the invention, this is understood to mean a preparation of the spatially bounded creation of the metallic structure. This is possible in different ways. Firstly, the substrate can be coated with the nanofibers only in particular regions. It is also possible to apply the precursor composition only to particular regions. In addition, it is of course also possible to limit the action of the electromagnetic radiation to particular regions. These methods can of course also be used in combination. For example, it is possible to apply the precursor composition over a full area and then to expose it through a mask. It is of course likewise possible to selectively apply the precursor composition and then to expose a full area.

Specifically in the case of use of electrospinning, it is also possible to apply the spun fibers to a structured substrate, especially a substrate with elongated depressions. Owing to their length, the fibers become ordered along the depressions.

After the process, it is also possible to apply further layers, for example in order to protect the coated surface of the substrate against UV radiation.

The structures applied by structuring are actually unrestricted. For instance, it is possible to apply connected structures such as conductor tracks. It is also possible to apply structures in the form of dots. Owing to the good resolution, it is possible by the process to apply conductive dots invisible to the eye to a film. This is very important in the production of surfaces for touchscreens.

The invention also relates to a process for producing photocatalytically active composite fibers comprising anatase and amorphous titanium dioxide as per the above embodiment according to (ii) as described above without the metalization. The spinning composition here comprises at least one hydrolyzable titanium compound or a condensate thereof, and at least one organic polymer and/or oligomer, as described above. These are, for example, the aforementioned hydrolyzable titanium compounds for the nanoparticles. It may be necessary first to convert the compound to a sol. This can be accomplished, for example, by adding an acid, such as acetic acid, hydrochloric acid, etc.

The spinning composition is spun by electrospinning and the fibers are applied to a substrate, and then, as described above, a thermal treatment above 400° C. and below 500° C. is conducted, preferably above 420° C. and below 480° C., even more preferably above 430° C. and below 470° C., especially 440° C. to 460° C. The duration of this thermal treatment is preferably between 30 minutes and 4 hours. Especially at temperatures between 430° C. and 470° C., fibers having particularly high porosity and simultaneously containing crystallites of anatase in a matrix of amorphous titanium dioxide are obtained. This is particularly favorable for homogeneous metalization. In this way, conductive structures can be obtained. The heating rate is preferably 1-3° C./min.

The fibers thus obtained are particularly advantageous for the process of the invention for producing metallic structures.

The invention also relates to a composite fiber obtained by the process of the invention.

The invention also relates to a substrate comprising at least one composite fiber obtained by the process of the invention.

The invention also relates to a coated substrate obtained by a process of the invention. Such a substrate features a photocatalytically active layer comprising photo catalytically active nanofibers. This layer has a thickness between 50 nm to 200 µm. Preferred layer thicknesses are between 100 nm and 1 µm, preferably 50 nm to 700 nm.

The fibers preferably comprise a composite composed of anatase and amorphous titanium dioxide, especially as obtained by the process of the invention.

In a further embodiment of the invention, the fibers have been at least partly metalized. Useful metals here are especially copper, silver, gold, nickel, zinc, aluminum, titanium, chromium, manganese, tungsten, platinum or palladium, preferably silver or gold. These may be individual particles. The fibers are preferably covered by the metal. This can be detected by TEM. More preferably, the coating on the substrate is conductive. This is understood to mean a structure which, at a distance of 5 mm, has a resistance in at least one direction of below 3 MΩ, preferably below 2 MΩ, most preferably below 1 MΩ. Owing to the fibrous structure, structures produced preferably have anisotropic resistance. This means that the resistance, depending on the direction of the measurement, changes by at least a factor of 2, at least a factor of 10, especially a factor of 100.

The thickness of the metallic layer may be up to 200 mm. Preferred layer thicknesses are between 10 and 100 nm, preferably 5 mm to 50 mm.

In a particularly advantageous embodiment of the invention, the coating on the substrate is at least partly transparent, especially fully transparent. This can be achieved in that the degree of coverage of the fibers after the electrospinning in the coated regions on the surface of the substrate is below 20% of the coated surface area of the substrate, especially between 10-20%, preferably between 10% and 15%. This can be effected, for example, via the duration of the electrospinning. The coverage can be determined by measuring the average transmission and haze as a function of the duration of the electrospinning.

Preferably, the coating with fibers reduces the average transmission only by up to 5%.

In a development of the invention, the substrate has structuring with structural elements having an extent of less than 50 µm, preferably less than 10 µm. The structural elements may be metallic and/or nonmetallic regions. More preferably, the metallic structure is a metallic coating of the nanofibers.

In a particularly advantageous development of the invention, the coated substrate has metallic structures which are at least partly transparent. This can be achieved, for example, by the application of structures having a resolution below 20 µm to a transparent substrate, preferably below 10 µm.

The coated substrates which are obtained by the process of the invention can be used for many applications.

Firstly, the process is suitable for application of reflective metal layers to surfaces. These can be used, for example, as reflective layers in holographic applications.

A particular advantage of the invention lies in the production of conductive structures. These are suitable as conductor tracks in electronic applications, especially in touchscreen displays, solar collectors, displays, as RFID antenna or in transistors. They are therefore suitable as a substitute in products which have to date been produced on an ITO (indium tin oxide) basis, for example in TCO coatings (TCO: transparent conductive oxide). It is especially possible to obtain transparent structures, and structures having anisotropic resistance.

The structures can alternatively be used in the field of transistors.

Further details and features will be apparent from the description of preferred working examples which follows, in conjunction with the subsidiary claims. In this context, the respective features in themselves or several in combination with one another can be implemented. The means of solving the problem are not limited to the working examples. For example, stated ranges always include all unspecified intermediate values and all conceivable sub-intervals.

The working examples are shown in schematic form in the figures. Identical reference numerals in the individual figures refer to elements which are identical or have the same function or correspond to one another in terms of their functions. Specifically, the figures show:

DETAILED DESCRIPTION OF INVENTION

Examples

Various strategies were used for the processes of electrospinning of the nanofibers.
(i) Introducing hydrothermally produced nanocrystals of $TiO_2$ into a polymer compound and electrospinning to give nanofibers;
(ii) Producing anatase-comprising fibers from $TiO_2$ from a titanium alkoxide precursor compound and polymer spinning compounds.
(iii) Coaxially electrospinning fibers with a polymer core and a shell of hydrothermally converted $TiO_2$ crystals and, after a heat treatment, washing out the polymer in order to obtain tubes of anatase.
(iv) Coaxially electrospinning fibers having a core of titanium alkoxide and a shell of hydrothermally produced $TiO_2$ crystals.

All substrates are used in order to photochemically deposit silver.

Experiments According to (i)

Ultrafine fibers were obtained by electrospinning a water-based sol of hydrothermally calcined $TiO_2$ nanocrystals. For this purpose, titanium tetraisopropoxide was mixed with isopropanol and hydrochloric acid in order to obtain a $TiO_2$ network. To this were added water and isopropanol in order to obtain a sol. The sol was then introduced into an isochoric autoclave and heated to 250° C. in order to obtain $TiO_2$ in anatase form. The nanocrystals obtained are redispersed and optionally surface-modified. To this composition is added high molecular weight polyvinylpyrrolidone (Mw=1 300 000 g/mol, hPVP) up to a content of 4% by weight (based on the overall composition).

Figure 1:
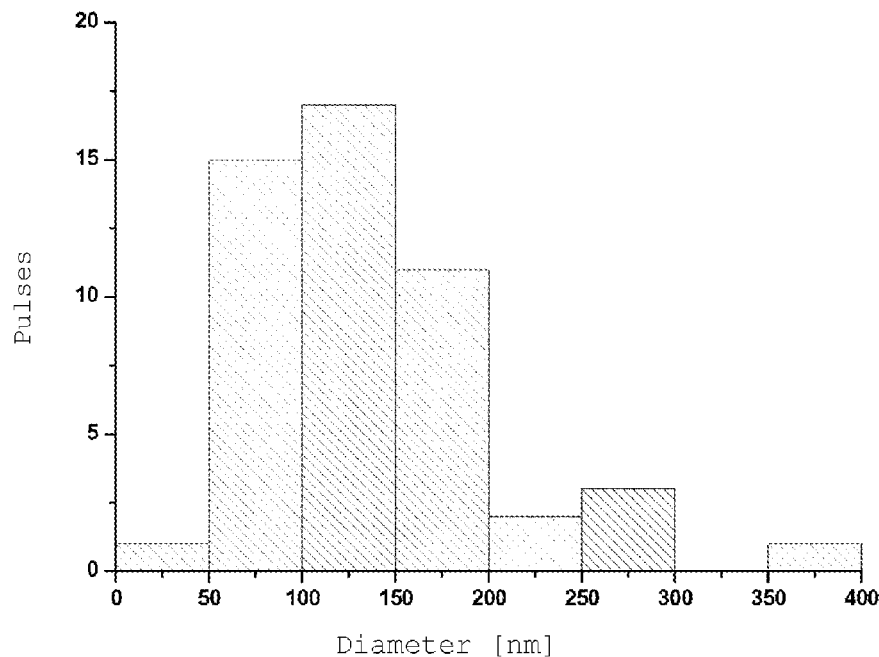
FIG. 1 a) distribution of the diameter ("Fiber Diameter" in nm versus pulses (counts)) of the fibers directly after production; b) ESEM image (Environmental Scanning Electron Microscope) of the fibers after (i)
Figure 1:
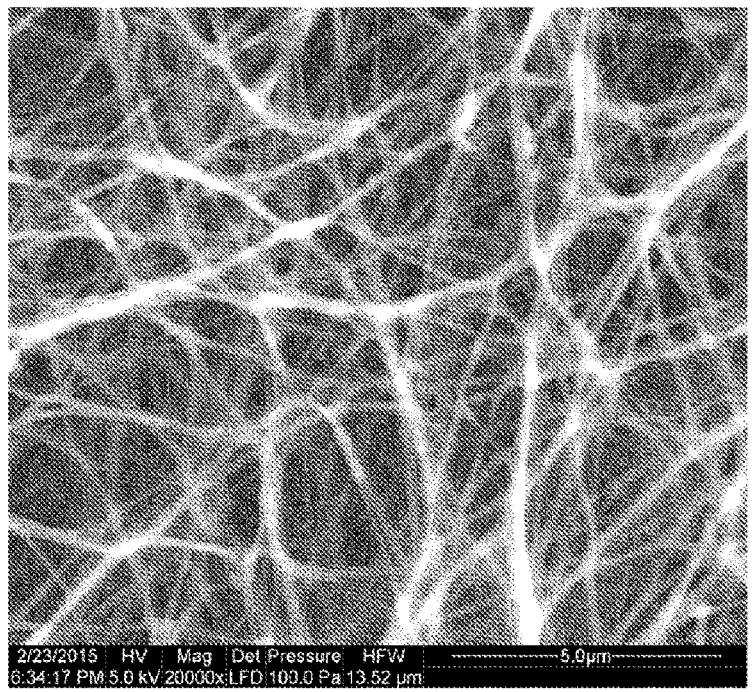

The fibers obtained are shown in FIG. 1. The fibers had a very fine diameter and have a somewhat uneven surface. This suggests that $TiO_2$ particles are arranged within the fibers.

Experiments According to (ii)

Anatase-comprising nanofibers were obtained as follows. By gradual hydrolysis of titanium tetraisopropoxide (Ti(O-iPr)$_4$) in acetic acid and ethanol in a ratio of 0.25:1:1, a sol was obtained. To this sol was added high molecular weight polyvinylpyrrolidone (Mw=1 300 000 g/mol, hPVP), and it was fully dissolved with addition of ethanol. The hPVP content was 9% by weight based on the overall composition.

By addition of different amounts of ethanol, compositions having a polymer concentration of 5% by weight were also produced.

The sol was left to stand for 24 hours (stirred slightly if appropriate) and electrospun under the following conditions:

A 21G spinneret was set up at a distance of 15 cm at right angles to a grounded copper plate wrapped with aluminum foil. A syringe pump was used to establish a flow of the spinning dope of 0.82 mL/h, or 0.5-0.8 mL/min (temperature 21° C., air humidity 43%). At a voltage between 18-21 kV, especially 18-20 kV, a spun filament formed.

Figure 2:
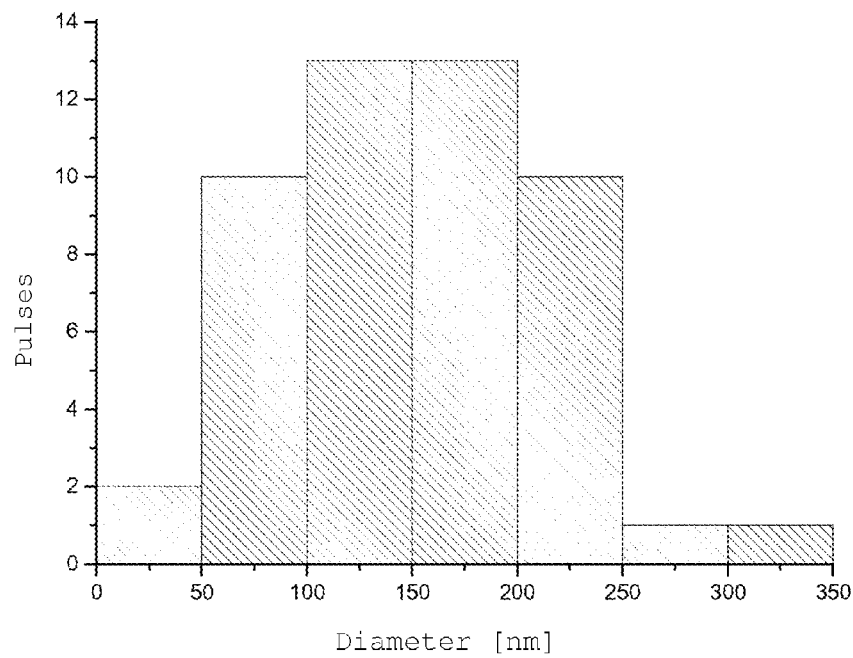
FIG. 2 a) distribution of the diameter ("Fiber Diameter" in nm versus pulses (counts)); b) ESEM image (Environmental Scanning Electron Microscope) of the fibers after (ii)
Figure 2:
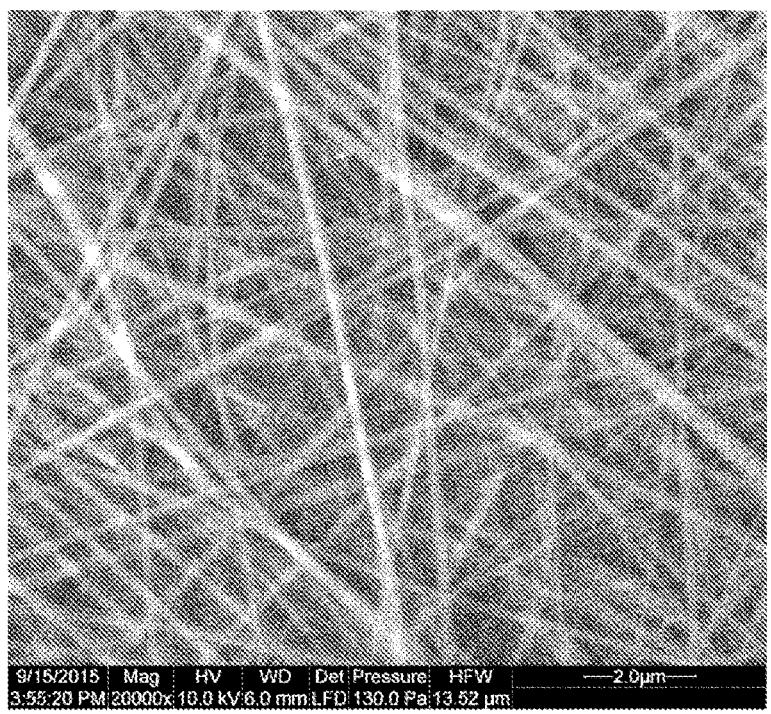

For optical tests, a 3 cm×3 cm glass plate was held under the spinneret (at a distance of 10 cm to 20 cm) for different periods (1 second and 15 seconds). FIG. 2 shows a typical distribution of the fiber diameter of the fibers. The fibers show an average diameter of 103+/−53 nm and a smooth cylindrical morphology.

In order to apply individual fibers to the surface, the fibers were applied with movement of the glass plate for 12 to 15 seconds (5% by weight; 0.5-0.8 mL/min; 21 gauge; 18-20 kV; FD 10-20 cm). This led to coverage of 12-15% of the glass surface with fibers. The fibers are 20 to 100 μm apart and, after calcination, all have a maximum diameter below 500 nm.

After the spinning, the fibers applied to the substrate were heated at 120° C. for 12 h in order to remove water and solvent. This can also be done at 80° C. for 12 to 24 h.

Thereafter, they were calcined at 500° C. (heating and cooling rate each 2.66° C./min). In order to examine optimal conditions for formation of anatase, two different dwell times of 5 minutes and 30 minutes were examined. The fibers with a dwell time of 30 minutes later showed improved coverage with silver. All examples for FIGS. 1 to 6 were calcined at 500° C. for minutes. In the case of the other samples, the calcination temperature and time are specified in each case. After the heating, the calcination temperature was maintained for the time specified.

The samples were cooled down to room temperature within at least 3 hours.

Figure 3:
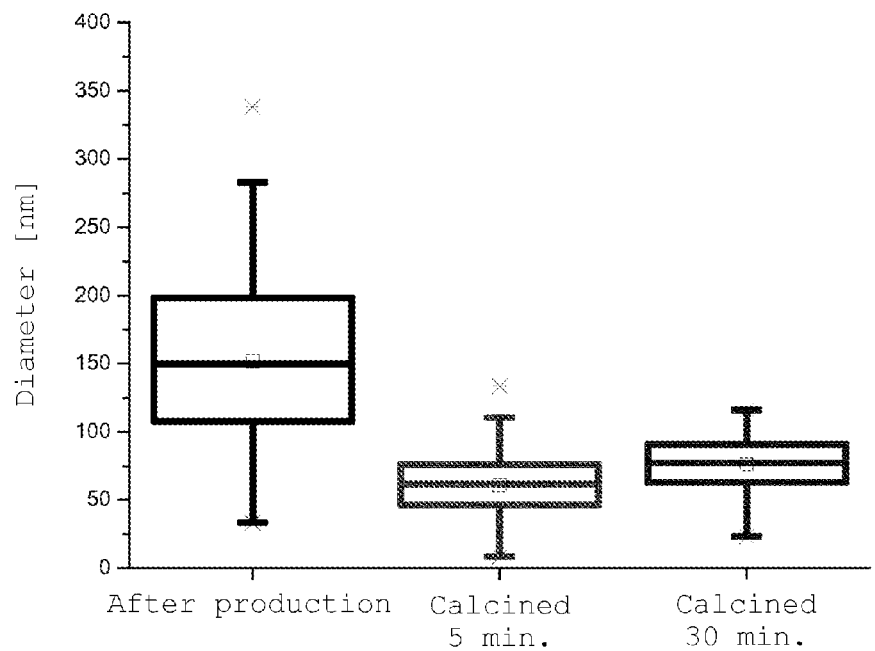
FIG. 3 a) representation of the diameter distribution ("Fiber Diameter" in nm) for fibers after the production ("As Spun") after calcination at 500° C. for 5 minutes (Calcinated 5 min) and calcination at 500° C. for 30 minutes (Calcinated 30 min); b) ESEM image of the samples after calcination for 30 minutes.
Figure 3:
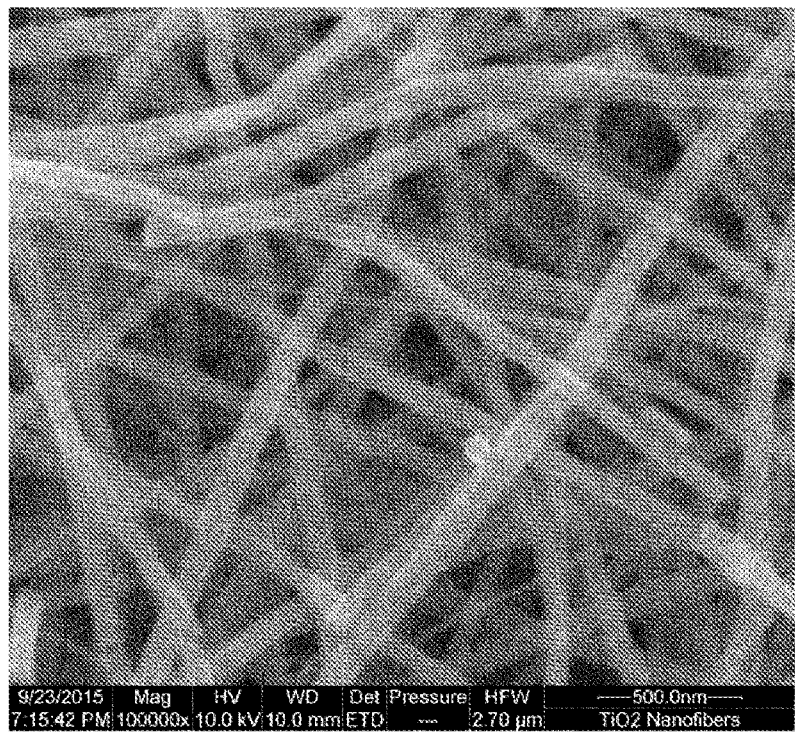
Figure 4:
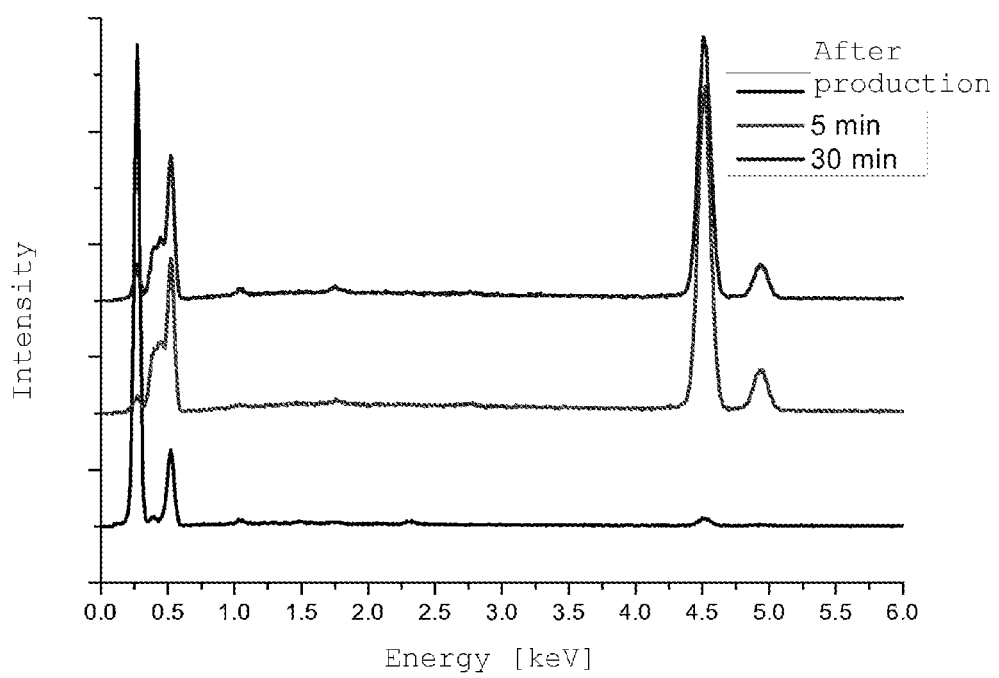
FIG. 4 EDS spectra of the fibers (energy in keV versus intensity) of the fibers after production ("As Spun" at the bottom), after calcination for 5 minutes (middle graph), and after calcination for 30 minutes (upper graph)
Figure 5:
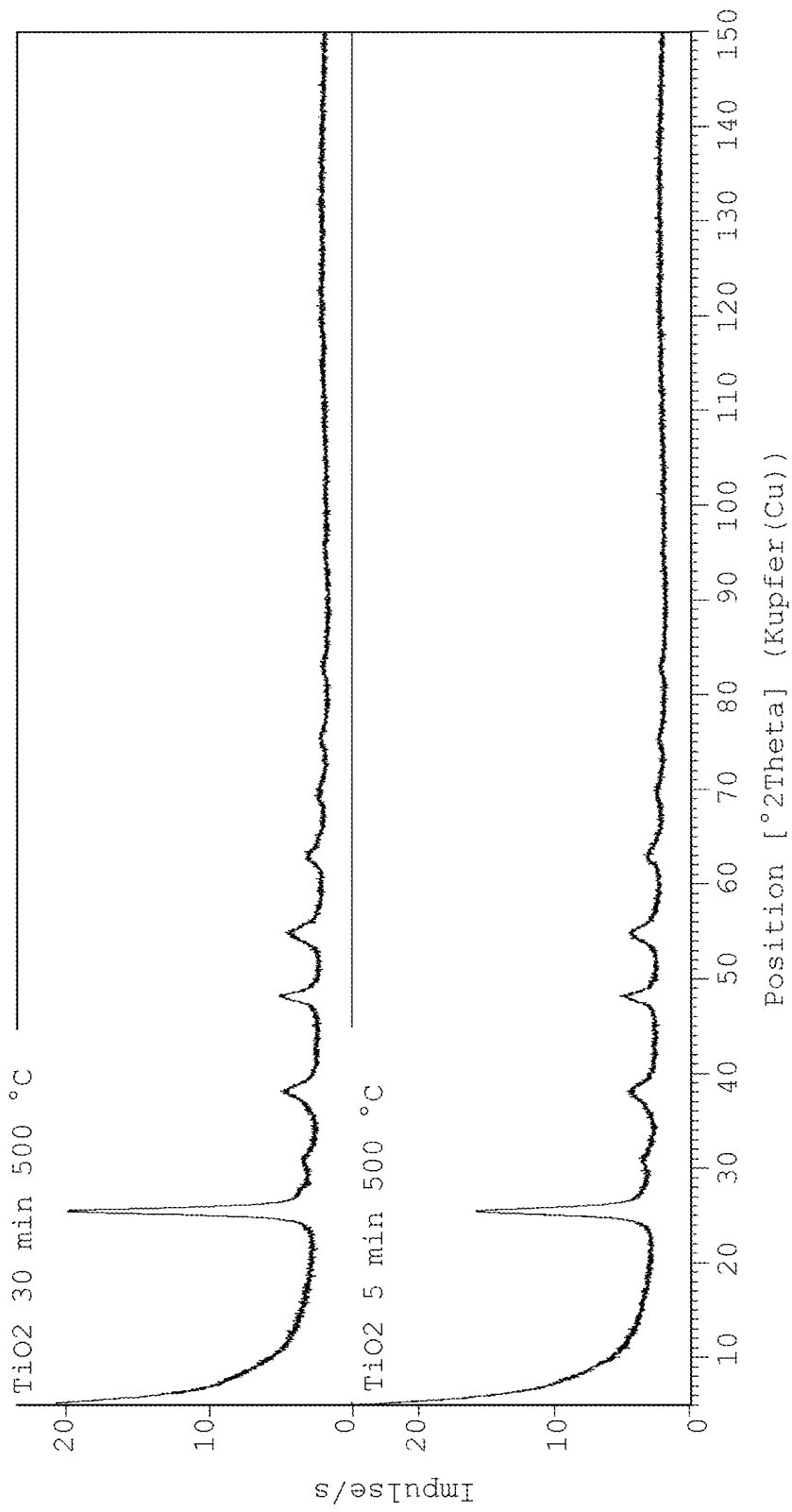
FIG. 5 XRD spectra of a sample after calcination at 5 minutes (lower graph), or 30 minutes (upper graph); the anatase signals are at 25.32°, 38° and 48.01°.

FIG. 3 shows the change in the diameter of the fibers resulting from the calcination. The fibers become distinctly thinner and the size distribution narrows. The EDS spectrum shown in FIG. 4 clearly shows a decrease in the peak at 0.277 keV and 0.525 keV, which corresponds to the Kα line of carbon and oxygen in the PVP ($[C_6H_9NO]_n$). The peak at 4.508 keV corresponds to Kα titanium. With longer calcination, the carbon reacts to give $CO_2$ and the oxygen forms $TiO_2$. The Ti Lα at 0.452 keV is also apparent in the spectrum. The low absorptions of carbon could be attributed to the securing band for the samples.

It has also been shown by means of x-ray diffraction (FIG. 5) that the calcination led to the formation of anatase crystals.

Figure 6:
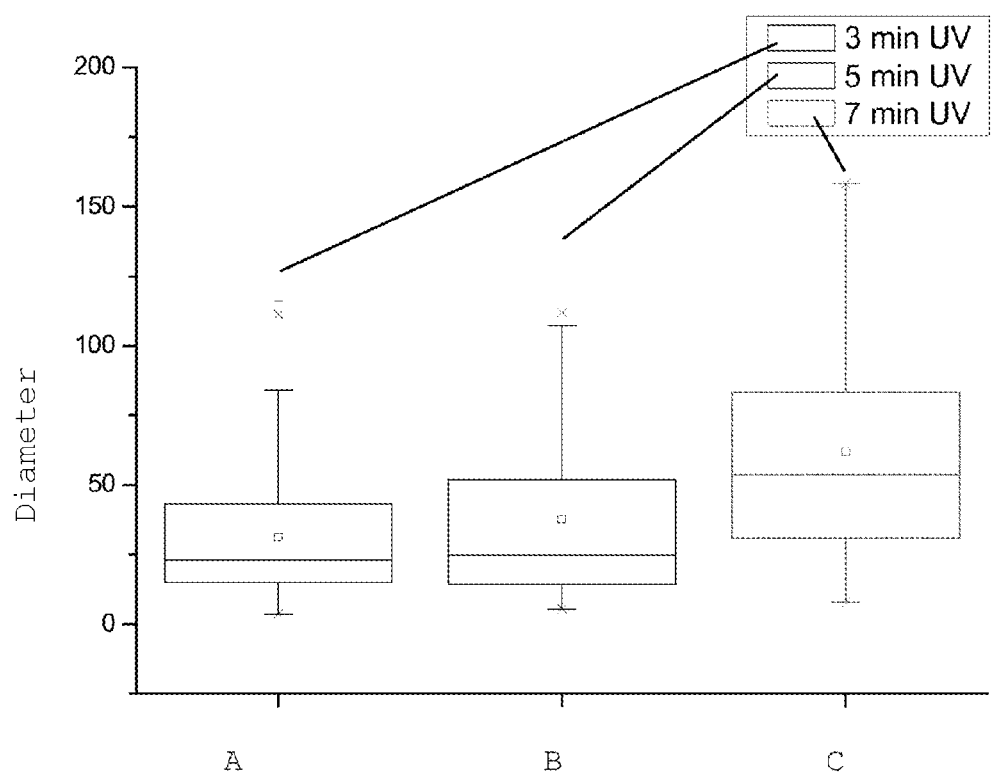
FIG. 6 size distribution (Range in nm) of the diameter of the silver particles formed on the fibers after irradiation for 3 minutes (A), irradiation for 5 minutes (B) and irradiation for 7 minutes (C)

FIG. 6 shows the size distribution of the silver nanoparticles formed on the surface after various irradiation times.

For the metalization in the examples which follow, an aqueous silver nitrate solution with a Tris complex was used as precursor for the metallic layer. The composition was freshly prepared and pipetted onto the fibers that had been applied to a glass plate before waiting for 30 seconds. Thereafter, the fibers were irradiated with UV light (1000 W) for 3 minutes. Thereafter, the samples were washed and irradiated once again with UV (1000 W) for 2 min. The washing reduces the spontaneous deposition of silver on the glass surface.

Figure 7:
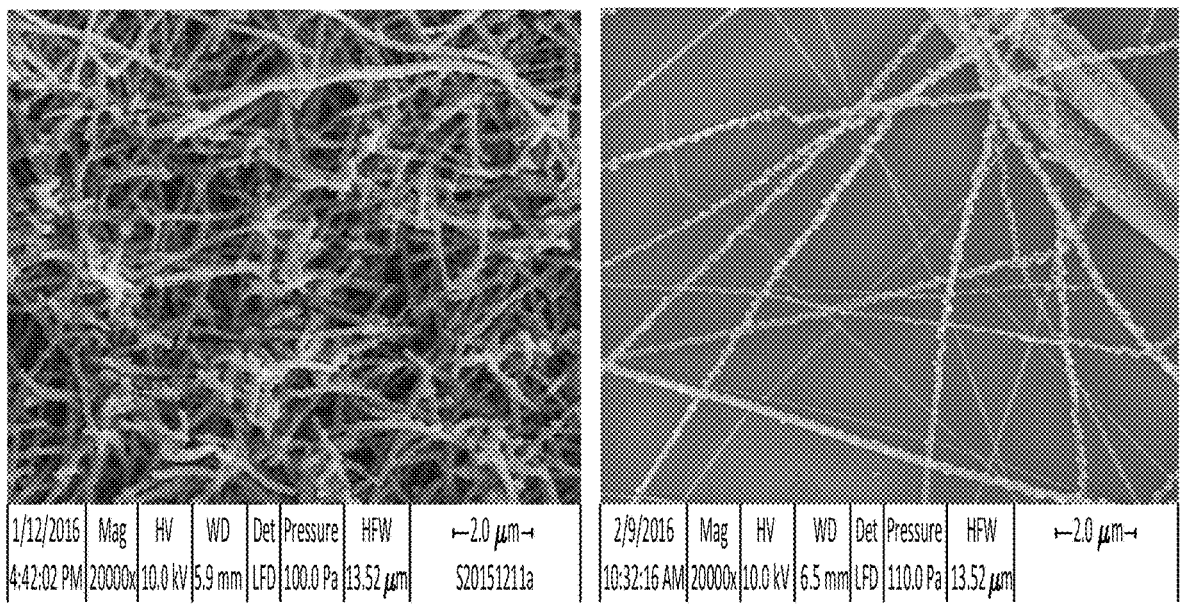
FIG. 7 ESEM image (on the left) of a $TiO_2$ mat after exposure to UV for 4 minutes in the presence of $AgNO_3$-tris complex; on the right: fibers with 30% coverage on glass, likewise exposed to UV for 4 minutes under the same conditions.

FIG. 7 shows, on the left-hand side, a mat of fibers (calcined at 500° C. for 30 minutes) after exposure for 4 minutes in the presence of an AgNO$_3$-Tris complex. The silver coating is metallic and conductive (11.8 Ωcm) with contact resistance. The fibers in the left-hand image were also exposed under the same conditions for 4 minutes and have incomplete coverage with silver and are nonconductive.

For further experiments, the influence of the distance before hitting the substrate ("fly distance", FD) in the electrospinning, the calcination time (CT) and the calcination temperature were examined as possible factors. In each case, fibers were produced from three different batches of starting material.

For all fibers produced on glass, the transmission was measured. The results are shown in table 1. In the sample designation, FD stands for the fly distance and CT for the calcination time in minutes. FD10CT60 therefore means a fly distance of 10 cm with a calcination time of 60 minutes. In the case of a respective coverage of 15% of the glass surface with fibers, no significant reduction in transmission is apparent.

At a coverage of 12-15% of the glass surface with fibers, a decrease in the transparency of up to 1% is measured, and after silver deposition of up to 2.5%, compared to untreated glass.

Figure 14:
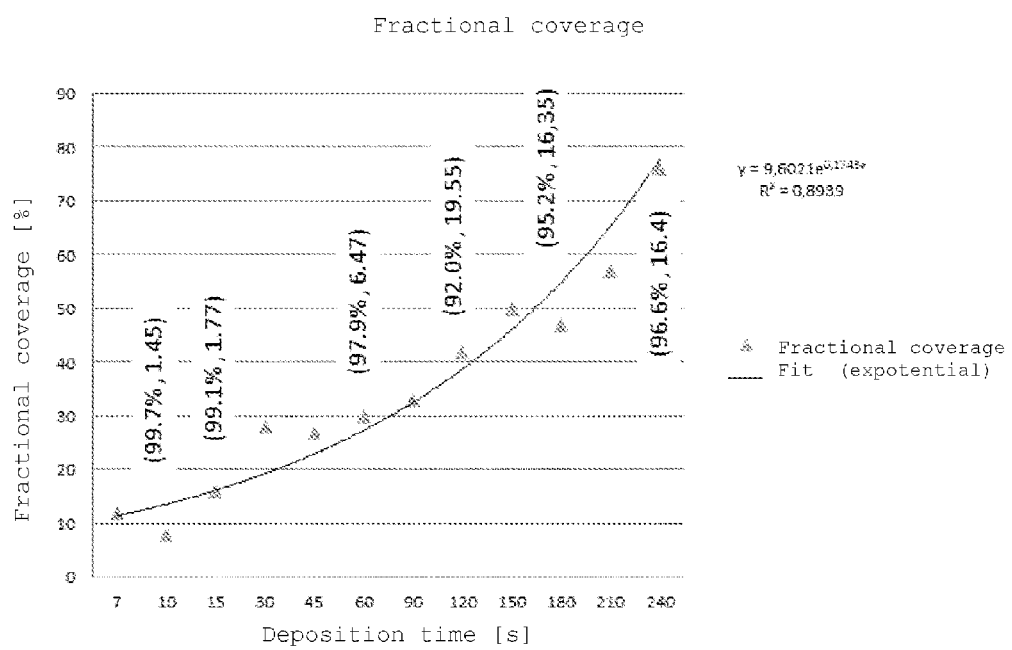
FIG. 14 determination of the Fractional Coverage as a function of the Deposition Time.

The determination of the coverage is shown in FIG. 14. For this purpose, the transmission or haze was measured as a function of the duration of the electrospinning. The numbers in brackets indicate the transmission and haze measured.

Figure 8:
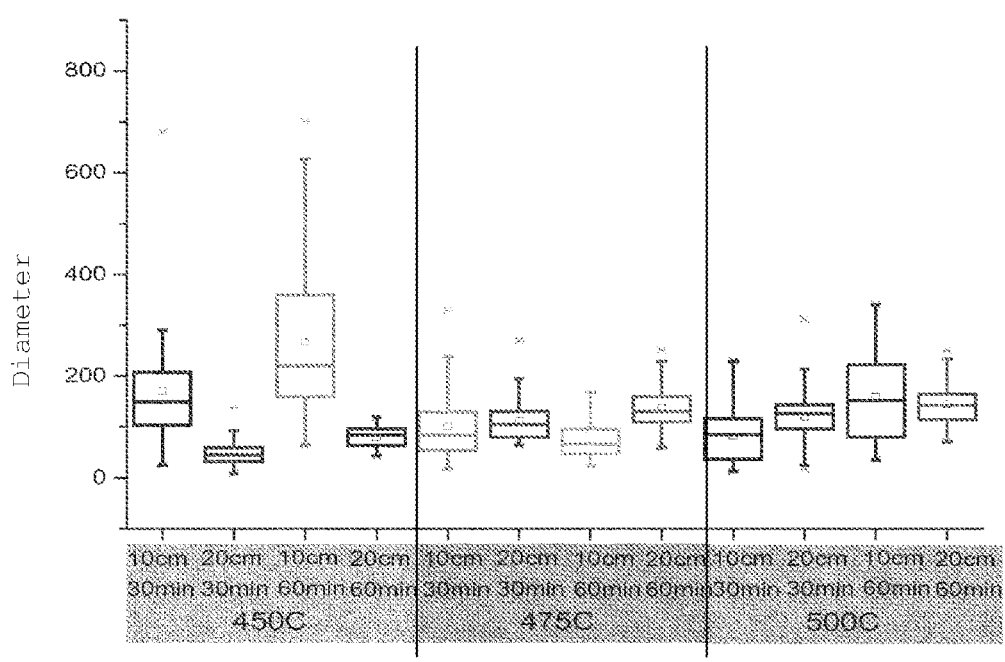
FIG. 8 distribution of the diameters of the fibers produced, measured by TEM.
Figure 9:
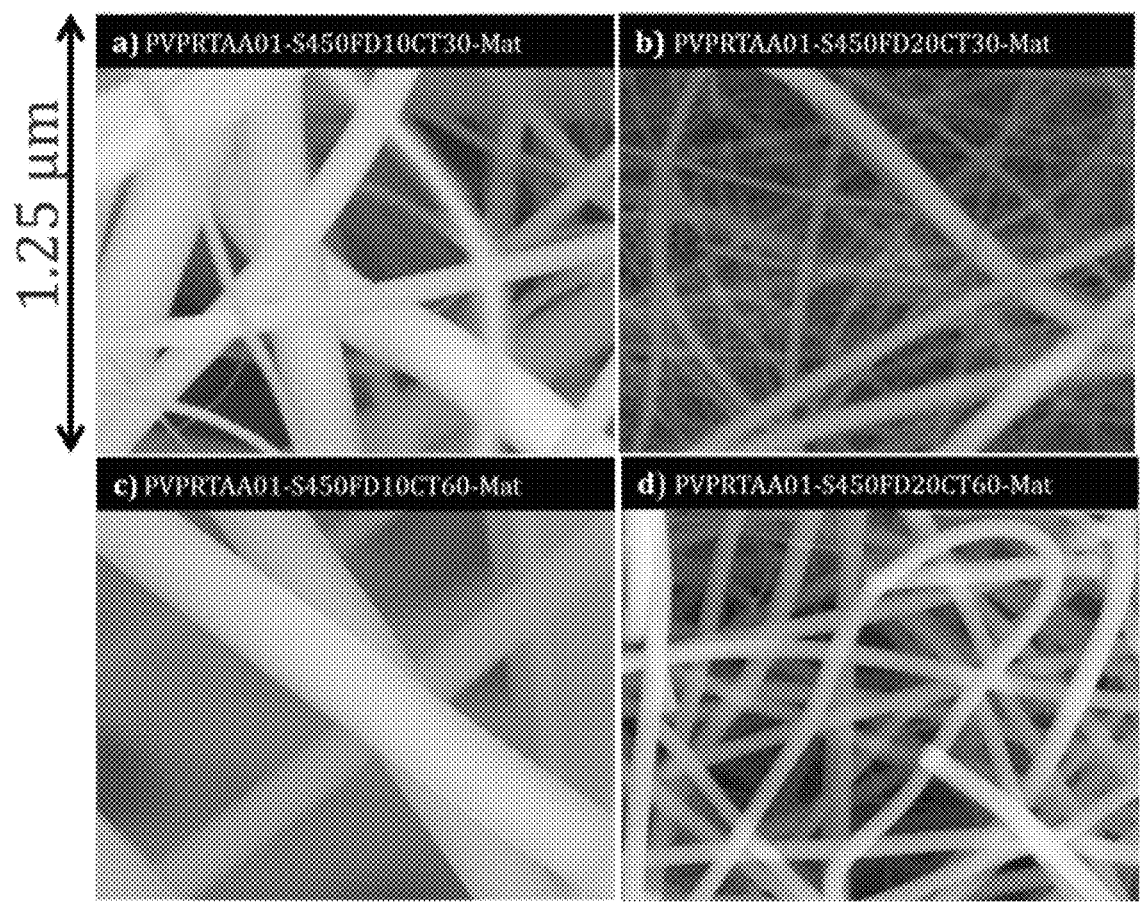
FIG. 9 ESEM images of samples with a calcination temperature of 450° C. and a) FD 10 cm, CT 30 min., b) FD 20 cm, CT 30 min., c) FD 10 cm, CT 60 min., d) FD 20 cm, CT 60 min.

FIG. 8 shows the distribution of the diameter of the fibers produced as a function of the flying distance (upper line of the X axis, 10 cm or 20 cm), calcination time (middle figure, 30 minutes and 60 minutes) and calcination temperature (450° C., 475° C. and 500° C. for the four combinations of flying distance and calcination time arranged above). The samples which were spun at flying distance 10 cm have a broader distribution because there is a bimodal distribution of very thin and thicker fibers (e.g. FIG. 9a). The fibers which were calcined at 450° C. have lower shrinkage than the fibers which were calcined at higher temperatures. Images of such fibers are shown in FIG. 9. The width of the figures corresponds to 1.25 μm. For determination of the diameter, the diameters of many fibers in a mat of fibers produced under the conditions mentioned were measured. The fibers have a cylindrical diameter.

Figure 10:
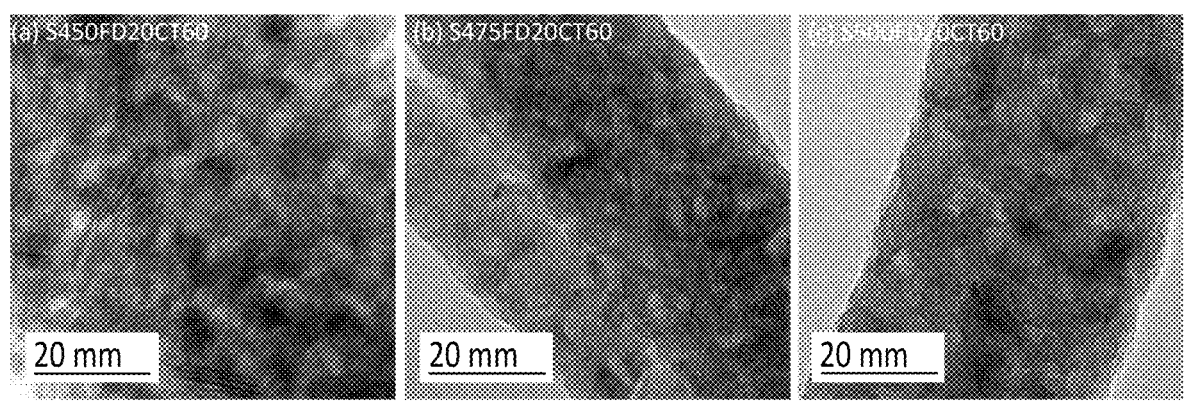
FIG. 10 representative TEM images of fibers calcined at (a) 450° C. for 60 min., (b) 475° C. for 60 min. and (c) 500° C. for 60 min.; FD in each case 10 cm.

FIG. 10 shows TEM images of fibers at different calcination temperatures. With increasing temperature, the crystallinity of the fibers increases.

Figure 11:
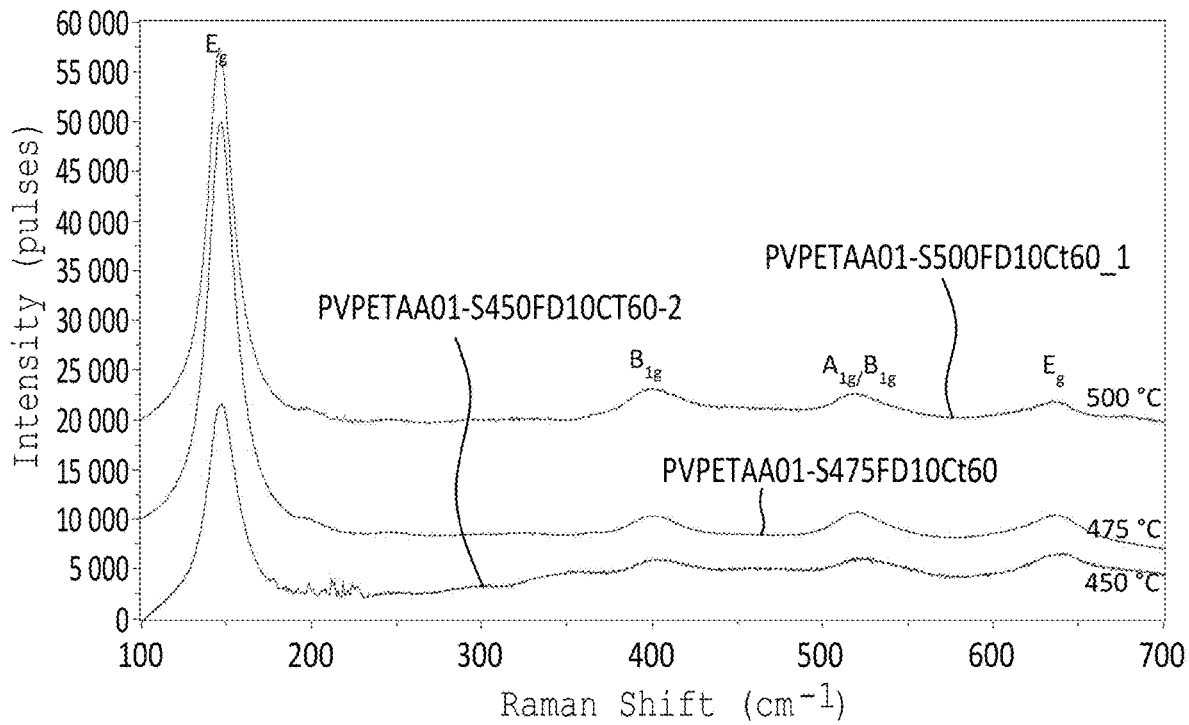
FIG. 11 Raman spectra of representative fibers calcined at 450° C., 475° C. and 500° C.

FIG. 10 shows TEM images of fibers after calcination at different temperatures. With increasing calcination temperature, there is a significant increase in the proportion of crystalline titanium dioxide or the size of the crystalline structure. This is also apparent from the RAMAN spectra in FIG. 11. The lower amplitude and the width of the peaks indicate lower crystallinity or nanocrystals. The peaks at 450° C. are much smaller than at 475° C. or 500° C. Moreover, the sample at 450° C. has unusual background fluorescence and very undefined peaks for O—Ti—O $B_{1g}$ and O—Ti—O $A_{1g}/B_{1g}$. This indicates that, in these fibers, anatase titanium dioxide is present in an extended network of Ti—O—Ti. In the case of the fibers calcined at 450° C., therefore, there is a composite of amorphous titanium dioxide and crystalline titanium dioxide. Specifically amorphous titanium dioxide features distinctly higher porosity.

Figure 12:
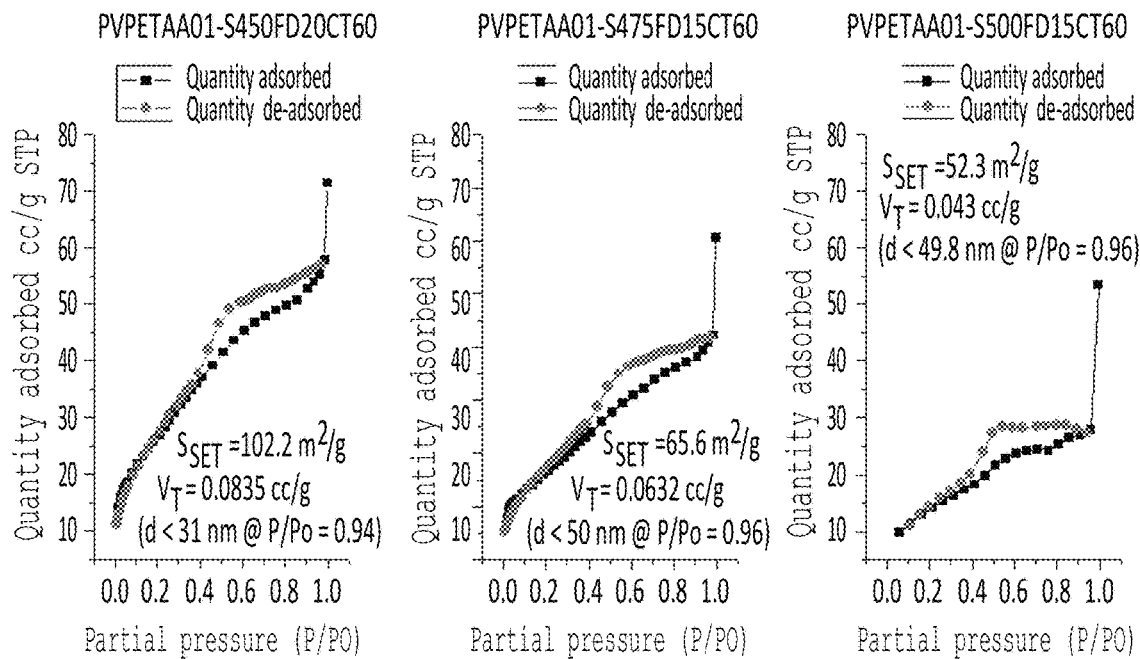
FIG. 12 plots of a gas sorption analysis of samples calcined at 450° C. (on the left, FD 20 cm), 475° C. (middle, FD 15 cm) and 500° C. (on the right, FD 15 cm), CT 60 minutes in each case; X axis Partial Pressure P/PO; Y axis in each case Quantity Adsorbed cc/g STP; squares: Quantity adsorbed; circles: Quantity de-adsorbed)

The high porosity is also shown in the capacity for gas sorption (FIG. 12). For fibers which have been calcined at 450° C., a specific surface area (SSA) of 102 m$^2$/g was measured (FIG. 12 on the left), whereas the fibers which have been calcined at 475° C. or 500° C. had a surface area of 66 m$^2$/g (FIG. 12, middle) and 52 m$^2$/g (FIG. 12, on the right) respectively.

For the silver deposition experiments which follow, the above-described AgNO$_3$/Tris complex was used. After the reduction, the samples were washed and dried for 2 hours. Thereafter, the transmission before and after metalization was measured. The results are shown in table 2. The metalization reduces the transmission by 1-4%, but for most samples only in the region of 1%.

For all samples which have been calcined at 450° C., it was possible to measure a conductivity. For this purpose, silver paste was applied at two ends of the glass for contact connection and the conductivity was measured. The distance between the contact points was 5 mm. The resistance was anisotropic owing to the fiber shape of the samples. The results are shown in table 3. The resistance also depended on how many fibers connect the contacts.

Figure 13:
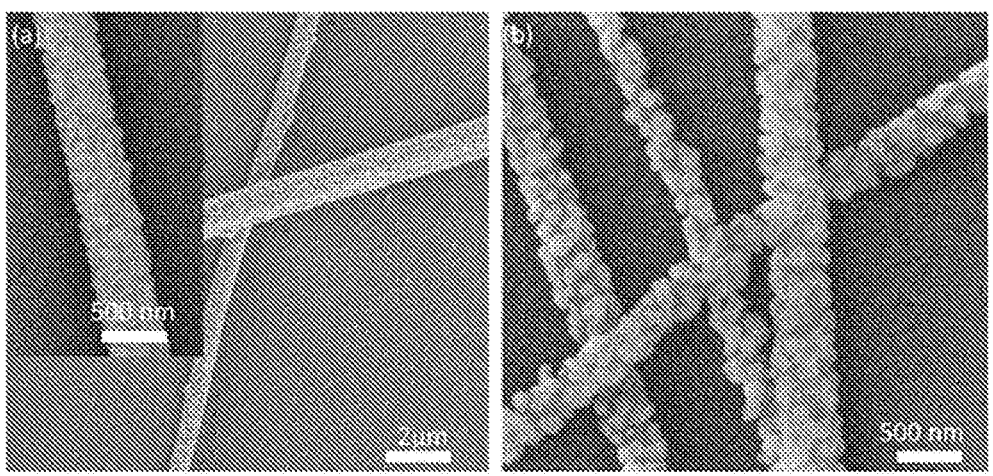
FIG. 13 images of fibers after silver deposition on fibers a) calcined at 450° C., FD 20 cm, CT 60 min.; b) calcined at 475° C., FD 20 cm, CT 60 min.

FIG. 13 shows two different metalized samples. FIG. 13a shows a metalized fiber (450° C., FD 20 cm, CT 60 min.) of a sample which showed conductivity. FIG. 13b shows a metalized fiber (475° C., FD 20 cm, CT 60 min.) of a sample which did not show conductivity. It is apparent that the silver deposition in FIG. 13a forms a shell around the fiber which leads to conductivity. In FIG. 13b, under the same conditions, only individual larger particles of silver have formed, but these do not lead to conductivity. It is assumed that the composite of amorphous titanium dioxide and anatase present in the fiber in FIG. 13a leads to the formation of the shell of metallic silver.

Samples which have been calcined only at 400° C. did not show any conductivity either.

TABLE 1

|  | Temp. (° C.) | Batch 1 | | | Batch 2 | | | Batch 3 | | |
| --- | --- | --- | --- | --- | --- | --- | --- | --- | --- | --- |
|  |  | T (%) | σ | n | T (%) | σ | n | T (%) | σ | n |
| FD10CT30 | 450 | 92.00 | 0.08 | 5.00 | 92.20 | 0.05 | 5.00 | 91.70 | 0.00 | 5.00 |
| FD20CT30 |  | 92.70 | 0.05 | 5.00 | 92.50 | 0.00 | 5.00 | 92.20 | 0.00 | 5.00 |
| FD10CT60 |  | 92.70 | 0.04 | 5.00 | 92.60 | 0.00 | 5.00 | 93.00 | 0.00 | 5.00 |
| FD20CT60 |  | 92.80 | 0.00 | 5.00 | 92.70 | 0.22 | 5.00 | 92.70 | 0.00 | 5.00 |
| FD10CT30 | 475 | 90.50 | 0.00 | 5.00 | 91.50 | 0.13 | 5.00 | 91.40 | 0.00 | 5.00 |
| FD20CT30 |  | 92.10 | 0.04 | 5.00 | 92.90 | 0.00 | 5.00 | 92.30 | 0.04 | 5.00 |
| FD10CT60 |  | 92.40 | 0.00 | 5.00 | 91.80 | 0.05 | 5.00 | 90.50 | 0.05 | 5.00 |
| FD20CT60 |  | 92.50 | 0.00 | 5.00 | 91.10 | 0.05 | 5.00 | 91.80 | 0.04 | 5.00 |
| FD10CT30 | 500 | 91.50 | 0.05 | 5.00 | 91.60 | 0.04 | 5.00 | 91.70 | 0.18 | 5.00 |
| FD20CT30 |  | 91.30 | 0.13 | 5.00 | 92.20 | 0.00 | 5.00 | 91.70 | 0.04 | 5.00 |
| FD10CT60 |  | 91.50 | 0.04 | 5.00 | 92.40 | 0.13 | 5.00 | 91.20 | 0.04 | 5.00 |
| FD20CT60 |  | 92.00 | 0.01 | 5.00 | 92.20 | 0.13 | 5.00 | 92.10 | 0.00 | 5.00 |
| Blank |  | 92.8 | 0 | 5 |  |  |  |  |  |  |

TABLE 2

| Sample | Temp. (°C.) | Batch 1 T (%) | σ | n | Batch 2 T (%) | σ | n | Batch 3 T (%) | σ | n |
|---|---|---|---|---|---|---|---|---|---|---|
| | After metallization | | | | | | | | | |
| FD10CT30 | 450 | NA | NA | NA | NA | NA | NA | NA | NA | NA |
| FD20CT30 | | 91.10 | 0.00 | 5.00 | 91.70 | 0.04 | 5.00 | 88.70 | 0.00 | 5.00 |
| FD10CT60 | | 92.10 | 0.00 | 5.00 | 90.30 | 0.04 | 5.00 | 89.00 | 0.00 | 5.00 |
| FD20CT60 | | 91.40 | 0.05 | 5.00 | 89.10 | 0.07 | 5.00 | 91.70 | 0.00 | 5.00 |
| FD10CT30 | 475 | 79.10 | 0.25 | 5.00 | 85.50 | 0.12 | 5.00 | 81.00 | 0.26 | 5.00 |
| FD20CT30 | | 90.90 | 0.09 | 5.00 | 91.80 | 0.00 | 5.00 | 90.20 | 0.05 | 5.00 |
| FD10CT60 | | 88.60 | 0.08 | 5.00 | 88.90 | 0.04 | 5.00 | 83.90 | 0.00 | 5.00 |
| FD20CT60 | | 88.20 | 0.21 | 5.00 | 84.80 | 0.14 | 5.00 | 80.30 | 0.05 | 5.00 |
| FD10CT30 | 500 | 85.40 | 0.00 | 5.00 | 86.10 | 0.00 | 5.00 | 87.30 | 0.09 | 5.00 |
| FD20CT30 | | 89.80 | 0.00 | 5.00 | 89.00 | 0.00 | 5.00 | 89.90 | 0.04 | 5.00 |
| FD10CT60 | | 88.40 | 0.00 | 5.00 | 90.60 | 0.04 | 5.00 | 82.00 | 0.13 | 5.00 |
| FD20CT60 | | 90.90 | 0.04 | 5.00 | 90.40 | 0.07 | 5.00 | 89.70 | 0.00 | 5.00 |

TABLE 3

| Sample | R (Ω) | d (mm) |
|---|---|---|
| S450FD20CT30-003 | 4M | 5 |
| | 4M | 5 |
| | 2M | 5 |
| S450FD10CT60-001 | 250 | 5 |
| | 11K | 5 |
| S450FD20CT60-001 | 1M | 5 |
| S450FD20CT60-003 | 13K | 5 |
| | 50K | 5 |
| | 62K | 5 |
| | 8M | 5 |

The invention claimed is:

1. A process for producing metallic structures, comprising:
    a) providing nanofibers by
        providing a spinning composition comprising at least one hydrolyzable titanium compound or a condensate thereof and at least one organic polymer and/or oligomer;
        electrospinning the composition to obtain photocatalytically active composite nanofibers;
        thermal treating the photocatalytically active composite nanofibers at above 420° C. and below 480° C. to obtain photocatalytically active composite nanofibers consisting of anatase titanium dioxide crystallites in a matrix of amorphous titanium dioxide; and
        applying the photocatalytically active composite nanofibers to a substrate;
    b) contacting at least one precursor compound for a metallic structure with the photocatalytically active composite nanofibers; and
    c) reducing the at least one precursor compound to the metallic structures by action of electromagnetic radiation on the photocatalytically active composite nanofibers.

2. The process as claimed in claim 1, wherein the photocatalytically active composite nanofibers have a specific surface area of at least 80 m$^2$/g.

3. The process as claimed in claim 1, wherein the at least one precursor compound is a silver, gold or copper complex.

4. The process as claimed in claim 1, wherein the photocatalytically active composite nanofibers have an average length of more than 10 μm.

5. A process for producing photocatalytically active composite fibers, comprising:
    a) providing a spinning composition comprising at least one hydrolyzable titanium compound or a condensate thereof, and at least one organic polymer and/or oligomer;
    b) electrospinning the composition; and
    c) thermal treatment of the fibers obtained at above 420° C. and below 480° C., thereby obtaining composite fibers consisting of anatase and amorphous titanium dioxide.

6. The process as claimed in claim 1, wherein the thermal treatment is conducted at above 430° C. and below 470° C.

7. The process as claimed in claim 1, wherein the electromagnetic radiation has a wavelength in the visible or ultraviolet range.

8. The process as claimed in claim 1, wherein the at least one organic polymer and/or oligomer comprises polyvinylpyrrolidone.

9. The process as claimed in claim 1, wherein the at least one precursor compound comprises a silver complex.

10. The process as claimed in claim 1, comprising applying a coating of the photocatalytically active composite nanofibers to 10-20% of a surface of the substrate and, after said reducing, obtaining a coated substrate.

11. The process as claimed in claim 1, wherein the substrate comprises ceramic, oxide ceramic, glass ceramic, paper, or cellulosic material.

* * * * *